United States Patent [19]

Sakamoto

[11] 4,160,195
[45] Jul. 3, 1979

[54] TAPE CONTROL APPARATUS

[75] Inventor: Hitoshi Sakamoto, Zama, Japan

[73] Assignee: Sony Corporation, Tokyo, Japan

[21] Appl. No.: 836,145

[22] Filed: Sep. 23, 1977

[30] Foreign Application Priority Data

Sep. 28, 1976 [JP] Japan .............................. 51/116170

[51] Int. Cl.² .......................................... B65H 77/00
[52] U.S. Cl. .................................... 318/7; 242/75.52
[58] Field of Search ............................. 318/7, 71, 432; 242/75.52

[56] References Cited

U.S. PATENT DOCUMENTS

| 3,715,641 | 2/1973 | Mattes | 318/7 |
| 3,913,866 | 10/1975 | Hankins | 318/7 X |
| 3,926,513 | 12/1975 | Silver et al. | 318/7 X |
| 4,015,177 | 3/1977 | Martins | 318/7 |

Primary Examiner—B. Dobeck
Attorney, Agent, or Firm—Lewis H. Eslinger; Alvin Sinderbrand

[57] ABSTRACT

Apparatus for controlling the speed, direction and tension of tape transported between a supply reel and a take-up reel. First and second drive motors are coupled to the supply and take-up reels for applying oppositely directed torques thereto, thereby bi-directionally driving the tape between these reels and applying back-tension to the driven tape. A speed detector detects the transport speed of the tape and generates a speed control signal proportional thereto. Torque voltage generators are responsive to the speed control signal for generating first and second torque voltages which are determinative of the torques respectively applied to the supply and take-up reels by the drive motors, the first and second torque voltages changing differentially with respect to each other as the speed control signal changes. The torque voltages are applied to motor drive means which is responsive to such torque voltages for producing first and second drive signals which, in turn, are applied to the drive motors to control the torque applied by the drive motors to the supply and take-up reels, whereby the tape is transported at a substantially constant speed. A command signal generator generates command signals to establish the speed and direction at which the tape is transported, and the first and second torque voltages are adjusted in response to the command signals to differentially change the drive signals produced by the motor drive circuit so as to differentially change the torques applied by the drive motors to the supply and take-up reels.

15 Claims, 12 Drawing Figures

TAPE CONTROL APPARATUS

BACKGROUND OF THE INVENTION

This invention relates to tape control apparatus and, more particularly, to such apparatus for controlling the speed, direction and tension of a tape member which is transported bidirectionally between a supply and a take-up reel.

The use of a tape member, such as paper tape, magnetic tape, or the like, has long been used for recording and storing information thereon such that the stored information can be reproduced and utilized at a subsequent time. This information, particularly when recorded on magnetic tape, has been in the form of analog signals representing, for example, audio information, video information or telemetered information, and also in the form of digital signals having particular use in data processing techniques, but also having application to the recording and reproducing of audio or video information. In many of the foregoing uses, such as when video information is recorded on magnetic tape or when magnetic tape is used in a data processing environment, it is necessary to provide accurate control over the direction and speed at which the tape is transported. For example, in a magnetic video recording and/or reproducing device, such as a video tape recorder (VTR), the tape is helically wrapped about at least a portion of a guide drum to enable one or more transducers which are rotatably supported within the drum to scan successive, parallel slant tracks across the tape. Desirably, video signals which are recorded on the tape can be reproduced by the VTR in a normal mode, in a slow-motion mode, in a quick-motion mode, in a still (or stop-action) mode or in a reverse mode. These various modes depend upon the speed and direction at which the tape moves across the guide drum. In each of these modes of operation, the tape should be driven at a uniform speed so as to avoid jitter and other undesirable defects in the video picture which is reproduced from the signals on the tape. Also, if the VTR is selectively operated so as to change the tape speed, such as for rewinding or fast-forwarding, the tape transport apparatus should be properly controlled to prevent the occurrence of a run-away condition, or the occurrence of undesired unwinding of tape, or the bursting or tearing of tape.

In a typical VTR, the magnetic tape normally is transported between a pair of reels such that tape is payed out from the supply reel and wound up, or accumulated, on the take-up reel. This reel-to-reel transport may be present either in the so-called open reel machine or in video cassette or cartridge machines wherein both reels are provided in a single, easily manipulatable housing. In such reel-to-reel transport systems, the tape should be transported with a substantially constant tension. In general, this is achieved by applying a take-up torque to the take-up reel and a counter torque to the supply reel, these opposite torques tending to provide a back-tension to the transported tape. An attendant problem in providing counter torques is to maintain a constant back-tension when the VTR is operated so as to accelerate or decelerate the tape, or to change the direction of tape transport. For example, if the counter torque applied to the supply reel is too small, tape will rapidly unwind therefrom if the transport speed is decelerated. Conversely, if the counter torque applied to the supply reel is too great, the back-tension on the tape may be high enough to damage the tape if its transport speed is accelerated.

One factor affecting the provision of a constant tape tension is the change in the effective diamters of the tape which is wound on the supply and take-up reels. Since these effective diameters are changing as the tape is transported, the inertia of the respective reels likewise is changing, thereby influencing the forward and counter torques which must be applied thereto. Thus, it is desirable to detect the effective reel diameters of the supply and take-up reels so that the torques which are applied thereto can be modified accordingly. While such reel diameters can be detected by using a mechanical follower in combination with a photosensing device, this type of arrangement may not provide the accuracy which is needed in maintaining a constant tape tension.

Another factor which should be taken into account in maintaining a constant tape tension in a tape transport system is friction between the tape and various guide elements in the transport path. Particularly in a VTR, friction exerted on the tape by the guide drum should be considered. At most operating speeds, this friction is independent of the tape speed and may be considered to be a constant. Because of this constant friction, it may be thought that tape tension can be controlled merely by adjusting the forward and counter torques without regard to this friction. However, if this friction changes for some reason, such as if the coefficient of friction of a portion of the tape is less than the remainder thereof, the back-tension on the tape may be too low, and a run-away condition may develop.

In a tape speed controlling device of the type described in U.S. Pat. No. 3,600,654, a forward torque is exerted upon the take-up reel and a counter torque is exerted on the supply reel. This counter torque provides a back-tension on the tape during its forward movement. However, the forward drive voltage which is used to drive the take-up reel merely is divided by a voltage divider circuit to a lower value for imparting a counter torque to the supply reel. If the forward tape speed exceeds a preset value, the voltage dividing ratio is adjusted so as to increase the voltage, and thus the counter torque, applied to the supply reel, thereby increasing the tape tension to reduce the tape speed. In apparatus of this type, neither the tape transport speed nor the tape tension is controlled accurately. Furthermore, the effects of friction in the tape run are not taken into account.

In another type of tape speed control apparatus, such as described in U.S. Pat. No. 4,015,177, there is a more continuous control over the tape transport speed. A signal representing the actual tape speed is compared to a reference signal representing desired tape speed, and any difference therebetween is used to develop voltages which are applied to the supply and take-up reel drive motors. The speed of the tape is maintained constant by differentially controlling the speeds of the reel drive motors. Although the tape speed is dependent upon the difference between the voltages applied to the respective motors, it is not clear whether these individual voltages are differentially related to each other. Furthermore, in this type of system, the effects of tape friction are not taken into account. Nor are the motor control voltages, or torques imparted to the tape reels, adjusted as a function of the changing effective reel diameters. Hence, it is difficult to maintain a desirably constant tension in the transported tape.

OBJECTS OF THE INVENTION

Therefore, it is an object of the present invention to provide improved tape control apparatus which avoids the aforenoted problems of prior art systems.

Another object of this invention is to provide apparatus for controlling the speed and direction of tape while maintaining a substantially constant tension therein.

A further object of this invention is to provide apparatus for controlling the transport of tape while taking account of frictional forces and changing tape-reel diameters in the tape transport system.

An additional object of this invention is to provide tape control apparatus wherein the speed and direction in which tape is transported can be changed, as desired, in a smooth manner without danger of uncontrolled tape unwinding or tape damage.

Yet another object of this invention is to provide apparatus for controlling the speed, direction and tension of transported tape wherein oppositely directed torques are imparted to tape supply and take-up reels and wherein such torques are maintained at predetermined values in the event that the actual direction in which the tape is transported differs from a commanded direction.

Various other objects, advantages and features of this invention will become readily apparent from the ensuing detailed description, and the novel features will be particularly pointed out in the appended claims.

SUMMARY OF THE INVENTION

In accordance with this invention, apparatus is provided for controlling the speed, direction and tension of tape transported between a supply reel and a take-up reel. First and second drive motors are coupled to the supply and take-up reels for applying oppositely directed torques thereto so as to bi-directionally drive the tape therebetween while applying back-tension to the driven tape. A speed detector generates a speed control signal proportional to the transport speed of the tape, and a torque voltage generating circuit is responsive to the speed control signal for generating first and second torque voltages which are determinative of the torques to be applied to the supply and take-up reels by the drive motors. The torque voltages change differentially with respect to each other as the speed control signal changes. Motor drive circuits are responsive to the torque voltages for applying first and second drive signals to the respective drive motors so as to control the torques which are imparted by the drive motors to the supply and take-up reels, whereby the tape is transported at a substantially constant speed. A command signaling circuit generates command signals to establish the speed and direction at which the tape is to be transported, and the torque voltages which are applied to the motor drive circuit are adjusted in response to these command signals to differentially change the torques applied by the drive motors to the supply and take-up reels. One feature of this invention is to detect the effective diameters of the tape wound upon the supply and take-up reels and to modify the motor drive signals produced by the motor drive circuit in accordance with the detected effective reel diameters. Another feature of this invention is to determine whether the direction in which the tape actually is transported corresponds to the direction command signal and, in the event that these directions differ from each other, to apply predetermined torque voltages to the motor drive circuit. This latter feature prevents a sudden reversal in tape movement in the event that the commanded tape speed is sharply reduced.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
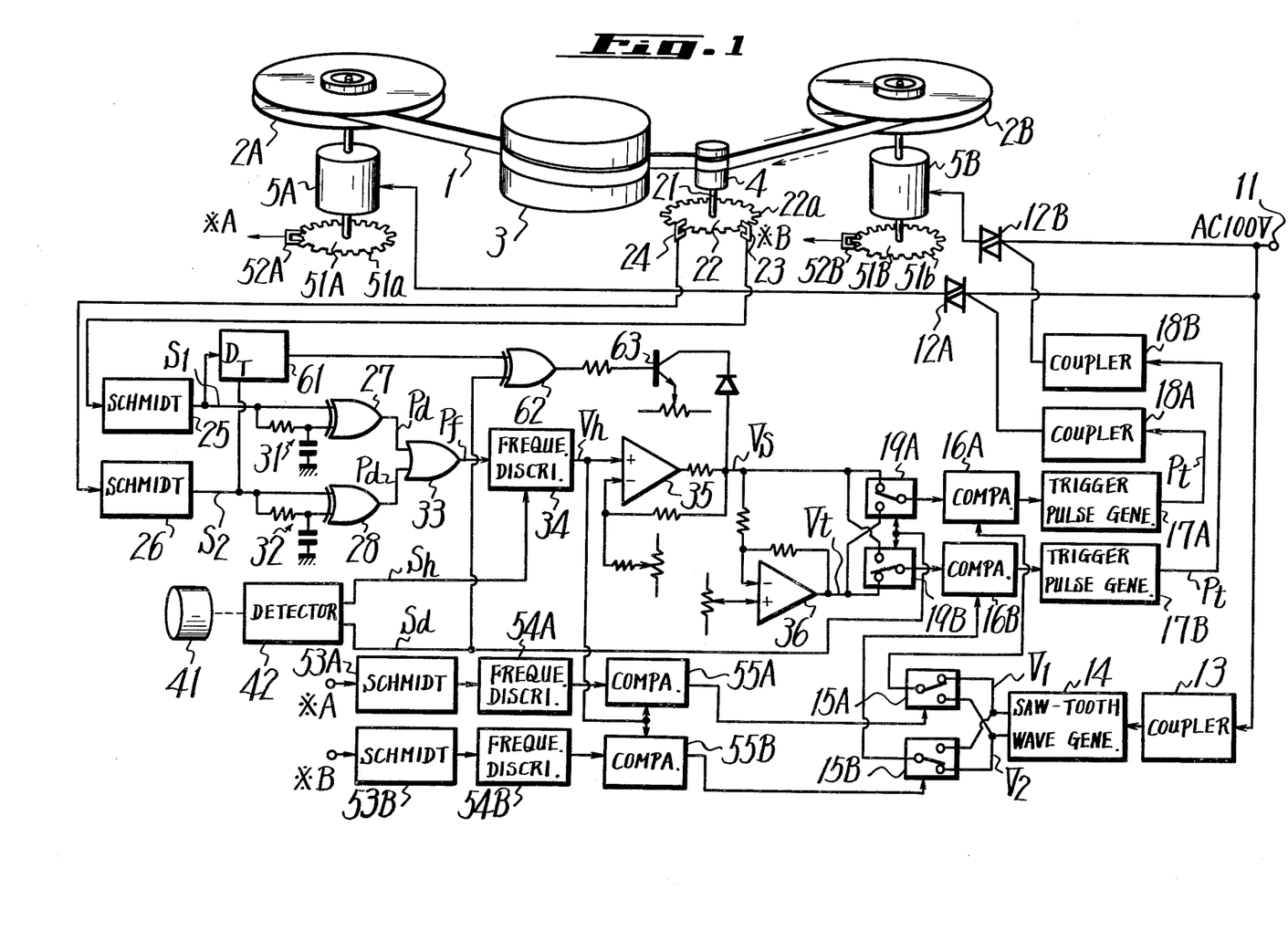
FIG. 1 is a block diagram of a preferred embodiment of tape control apparatus in accordance with the present invention.

Referring now to FIG. 1, there is illustrated a block diagram of tape control apparatus in accordance with a preferred embodiment of the present invention wherein tape 1 is bi-directionally transported between reels 2A and 2B. As may be appreciated, if tape 1 is transported in the direction indicated by the solid arrow, reel 2A may be designated the supply reel and reel 2B may be designated the take-up reel. If the tape is transported in the opposite direction, as indicated by the broken arrow, then reel 2B is considered the supply reel and reel 2A is considered the take-up reel. As one application thereof, the tape transport system may be provided in a video tape recorder (VTR) and, thus, tape 1 is helically wrapped about at least a portion of a guide drum 3 so that one or more rotary transducers, provided within the guide drum, are adapted to scan successive, parallel slant tracks across the tape for the purpose of recording and/or reproducing video information. As also shown, a roller 4 is in contact with tape 1 and rotates in a direction and at a speed determined by the movement of the tape. As will be explained below, roller 4 is used to detect the speed and direction at which tape 1 is transported between reels 2A and 2B.

Drive motors 5A and 5B are mechanically coupled to reels 2A and 2B, respectively, these drive motors being adapted to receive drive signals, such as currents or voltages, for developing output torques which are respectively applied to the reels so as to transport tape 1 therebetween. More particularly, and as will be explained below, the torques developed by motors 5A and 5B are oppositely directed such that, for example, motor 5B drives reel 2B in the tape take-up direction, while motor 5A drives reel 2A in the opposite direction. These oppositely directed torques are of different magnitudes so that tape is transported in the direction determined by the differential between these torques, with the torque applied to the supply reel providing a back-tension for proper tape transport.

Figure 2:
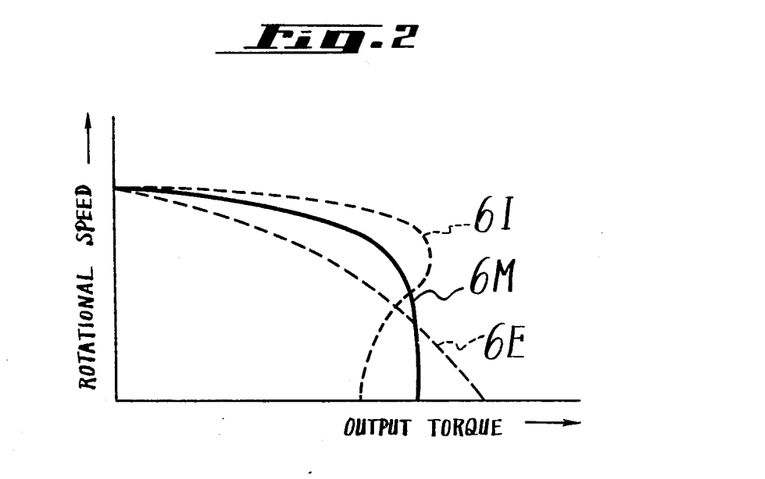
FIG. 2 is a graphical representation of the speed vs. torque characteristics of various motors.

Before describing the motor drive circuitry shown in FIG. 1, reference is made to FIG. 2 which represents the speed vs. torque characteristics of various drive motors. In particular, the ordinate in FIG. 2 represents the rotation speed of the motor and the abscissa represents the output torque developed by that motor. A typical induction motor exhibits the speed/torque characteristic shown by broken curve 6I. The speed/torque characteristic of an eddy current motor is represented by broken curve 6E. In the embodiment shown in FIG. 1, drive motors 5A and 5B are induction motors, but the advance capacitor and input resistor of each motor are selected such that the speed/torque characteristic of each of motors 5A and 5B is as represented by solid curve 6M. Thus, the output torque developed by each of the motors used in FIG. 1 is seen to be substantially constant at the low and middle motor speeds, that is, at the speeds of normal motor operation.

Figure 3:
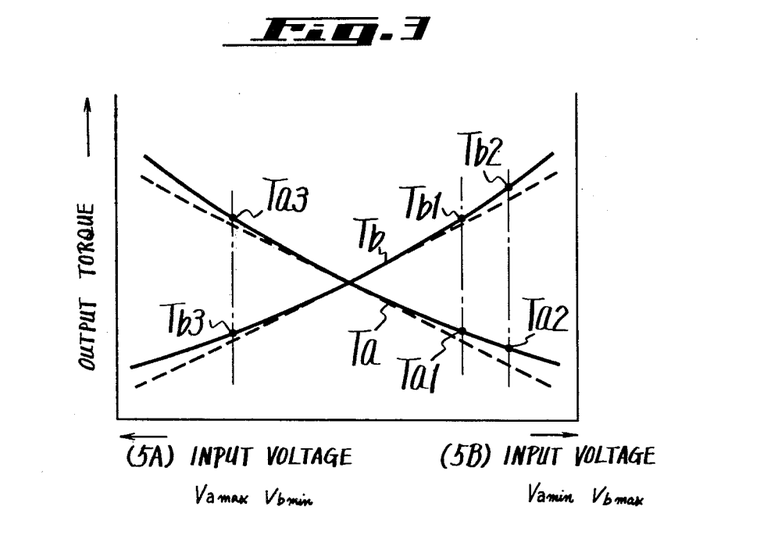
FIG. 3 is a graphical representation of the torque vs. voltage characteristics for the reel drive system used with the present invention.

Since counter torques are imparted to reels 2A and 2B by motors 5A and 5B, the tension exerted on tape 1 is determined by this torque differential. Accordingly, the control signals, such as control voltages, which are used to drive motors 5A and 5B, are differentially related with respect to each other. This relationship between the torques and drive voltages of the motors is shown in FIG. 3 wherein the ordinate represents output torque of each motor and the abscissa represents the drive voltage. If it is assumed that reel 2A is the supply reel and that reel 2B is the take-up reel, then the voltage $V_a$ applied to motor 5A increases from right to left along the abscissa to produce a corresponding increase in the output torque of this motor. Also, the drive voltage $V_b$ applied to motor 5B increases from left to right to produce a corresponding increase in the output torque developed by motor 5B. Hence, FIG. 3 shows the torque/voltage characteristic $T_a$ for motor 5A and the torque/voltage characteristic $T_b$ for motor 5B superimposed upon the same axes. These superimposed characteristics facilitate an understanding of the differentially applied torques which are imparted to reels 2A and 2B. For forward tape movement at constant tension, the torque imparted to reel 2B may be equal to, for example, torque $T_{b1}$, while the torque imparted to reel 2A for proper back-tension of the tape is equal to $T_{a1}$. As shown in FIG. 3, if the tape is to be driven at a faster speed, torque $T_b$ is increased from $T_{b1}$ to $T_{b2}$, while torque $T_a$ is reduced from torque $T_{a1}$ to torque $T_{a2}$. This differential change in torques $T_b$ and $T_a$ not only increases the tape speed but maintains a substantially constant tape tension.

FIG. 3 shows two sets of superimposed characteristics. One set is represented by solid curves $T_a$ and $T_b$ which are nonlinear, and another set is represented by broken lines which are linear. In accordance with the present invention, the torque/voltage characteristics of the reel drive system are as shown by the solid curves and not by the broken lines. This is because the present invention takes the friction forces exerted on tape 1 into account. If the tape is transported at the low or middle speeds, such as represented by the constant torque portion of curve 6M (FIG. 2), then the friction is substantially independent of tape speed and may be considered to be relatively constant. As a typical example, this friction, which may be represented as $e^{\mu\theta}$, is about three times the back-tension in tape 1 at the supply side of the transport system, that is, three times the tension caused by the differential between torques $T_b$ and $T_a$ (assuming that the effective reel diameter of the supply and take-up reels is fixed). Therefore, the tension due to torques $T_a$ and $T_b$ will always be constant if it is equal to three times the values shown in FIG. 3. For example, if torques $T_a$ and $T_b$ have the values $T_{a1}$ and $T_{b1}$, as shown, the tape tension will be stable at three times these values. When the torques change to the values $T_{a2}$ and $T_{b2}$, respectively, so as to increase the tape speed, the tape tension will remain constant.

If the torque/voltage characteristics of the reel drive system are as shown by the broken lines in FIG. 3, then the change in torque $T_a$ will be equal to the change in torque $T_b$. That is, the decrement $(T_{a1}-T_{a2})$ will be equal to the increment $(T_{b2}-T_{b1})$. This means that both reels 2B and 2A will accelerate, and the acceleration of these reels will be equal. Because of these equal accelerations, tape speed will be increased without changing the tension in tape 1. Also, since the torque decrement $(\Delta T_a)$ is equal to the torque increment $(\Delta T_b)$, the tape tension should remain constant. However, as mentioned above, friction is equal to about three times the tension due to the torques whose values are as shown in FIG. 3. Consequently, if the torque/voltage characteristic $T_a$ is represented by the broken line, the decrement $T_a$ may be sufficient for the reduced torque value $T_{a2}$ to be reduced into the negative region (not shown in FIG. 3). Physically, this means that the torque imparted to reel 2A reverses from being a counter torque to being a supply torque. That is, when friction is considered, if the torque/voltage characteristics are as shown by the broken lines in FIG. 3, an increase in torque $T_b$ may be accompanied by a decrease in torque $T_a$ such that the resultant torque $T_a$ provides a positive rotation of reel 2A, rather than the tendency to provide a counter rotation. The significance of this is that if the tape friction is subjected to a change, for example, if the coefficient of friction of a portion of the tape differs from the remainder of the tape, there is the possibility that reel 2A will undergo a positive rotation, resulting in a run-away condition. To avoid this problem, the torque/voltage characteristics of the reel drive system do not correspond to the broken lines shown in FIG. 3. Rather, these characteristics are as shown by the solid curves which are non-linear. These curves indicate that torques $T_a$ and $T_b$ always will be in the positive region.

Turning now to the reel drive system shown in FIG. 1 and, more particularly, to the motor energizing circuitry, this circuit includes thyristor devices 12A and 12B which are coupled to an AC supply input 11 for supplying AC signals, or at least portions of each AC cycle, to motors 5A and 5B, respectively. Each thyristor device includes a gate electrode which is coupled to a servo-control circuit comprised of a reference generator 14, comparators 16A and 16B, pulse generators 17A and 17B, a speed detecting circuit and torque voltage generators 35 and 36. Reference generator 14 preferably is a sawtooth generator coupled to AC supply input 11 via a suitable coupling circuit 13, such as an insulating coupler. Sawtooth generator 14 is synchronized with the AC signal provided at input 11 so as to generate a sawtooth waveform for each half-cycle of the sinusoidal AC signal. In one embodiment, the output of sawtooth generator 14 may be coupled through an additional amplifier such that this sawtooth generator produces sawtooth waveforms $V_1$ and $V_2$ having different signal levels. Preferably, sawtooth signal $V_1$ is of a lower level than sawtooth signal $V_2$.

Signals $V_1$ and $V_2$ are applied to change-over switch 15A and also to change-over switch 15B. Each change-over switch is represented by two stationary inputs adapted to receive sawtooth signals $V_1$ and $V_2$, respectively, and a movable contact which is adapted to selectively engage one or the other of the stationary inputs. The output of change-over switch 15A, that is, its movable contact, is coupled to one input of a comparator 16A, and the output of change-over switch 15B is coupled to an input of a comparator 16B. Comparator 16A is coupled, via a change-over switch 19A, to torque voltage generator 35 so as to receive a torque voltage $V_s$, and comparator 16B is coupled via a change-over switch 19B to torque voltage generator 36 so as to receive a torque voltage $V_t$. As will be described, torque voltages $V_s$ and $V_t$ are respective DC levels, and these levels are compared to sawtooth signals $V_1$ and $V_2$, respectively, by comparators 16A and 16B to determine when the decreasing amplitude of each sawtooth signal is equal to the received torque voltage. Accordingly, comparators 16A and 16B may be of conventional design for producing output signals when the amplitude of sawtooth signal $V_1$ reaches torque voltage level $V_s$, and when the amplitude of sawtooth signal $V_2$ reaches torque voltage level $V_t$. The outputs of comparators 16A and 16B are coupled to pulse generators 17A and 17B, respectively, for triggering these pulse generators to produce output pulses. These pulses are supplied through coupling circuits 18A and 18B, which may be similar to coupling circuit 13, for application as triggering pulses to the gate electrodes of thyristor devices 12A and 12B, respectively.

The tape speed detecting circuit is comprised of a shutter disc 22 coupled via shaft 21 to roller 4 and rotatable with the roller. First and second photodetectors 23 and 24, respectively, are provided, each photodetector including a light source disposed on one side of shutter disc 22 and a photosensor disposed on the opposite side of the shutter disc. As shown, the shutter disc includes periodic serrations, or light-transmissive and light-blocking portions so that, as shutter disc 22 rotates, the light impinging upon the photosensors periodically is interrupted. Hence, photodetectors 23 and 24 produce periodic signals corresponding to the alternate serrations of the shutter disc. Photodetector 23 is coupled to a Schmitt trigger 25 and photodetector 24 is coupled to a Schmitt trigger 26. The purpose of these Schmitt triggers is to shape the waveforms produced by photodetectors 23 and 24. These shaped waveforms are pulse signals having a duty cycle dependent upon the ttime constant of the Schmitt triggers and the rotary speed, or frequency, of shutter disc 22. As the speed of tape 1 increases, the rotation of shutter disc 22 correspondingly increases, and the fixed duration of the pulses produced by Schmitt triggers 25 and 26 exhibit a greater proportion of each cycle, thus increasing the duty cycle. Conversely, as the speed of tape 1 decreases, the duty cycle of the pulses produced by Schmitt triggers 25 and 26 also decreases. Preferably, a pulse is transmitted at each positive and negative transition in the outputs of Schmitt triggers 25 and 26. In the illustrated embodiment, these pulses are produced by providing an exclusive-OR circuit 27 having one input coupled directly to Schmitt trigger 25 and another input coupled via a delay circuit 31 to the output of Schmitt trigger 25. Exclusive-OR circuit 28 similarly includes one input coupled directly to the output of Schmitt trigger 26 and another input coupled via a delay circuit 32 to the output of this Schmitt trigger. As is known, an exclusive-OR circuit produces a binary "1" only if the signals applied to its inputs differ from each other, and produces a binary "0" if the input signals applied thereto are the same. Delay circuits 31 and 32 each include a capacitor, as shown, so that when each Schmitt trigger produces a binary "1" at its positive transition, the capacitors included in delay circuits 31 and 32 slowly charge, whereby exclusive-OR circuits 27 and 28 each produce a binary "1" until the capacitors are charged. At the negative transition of the output of Schmitt triggers 25 and 26, a binary "0" is supplied thereby to exclusive-OR circuits 27 and 28 while the charged capacitors included in delay circuits 31 and 32 each provide a binary "1" to the respective exclusive-OR circuits. Hence, these exclusive-OR circuits each produce a binary "1" until the capacitors included in delay circuits 31 and 32 are discharged. Thus, exclusive-OR circuit 27 produces a pulse at each positive and negative transition in the output of Schmitt trigger 25, and exclusive-OR circuit 28 likewise produces a pulse at each positive and negative transition in the output of Schmitt trigger 26. The pulses produced by exclusive-OR circuits 27 and 28 are coupled to an OR circuit 33, and the output of this OR circuit is coupled to a frequency discriminator 34.

In the illustrated embodiment, photodetectors 23 and 24 are angularly displaced from each other such that the outputs produced thereby exhibit a phase difference therebetween of 90°. Hence, the output pulses produced by Schmitt triggers 25 and 26 likewise exhibit a phase difference of 90°. As will be described below, this phase difference is used to determine the direction in which shutter disc 22 rotates and, therefore, the direction in which tape 1 is transported. Since pulses are produced at the positive and negative transitions of the outputs of Schmitt triggers 25 and 26, the frequency of the pulses produced by exclusive-OR circuit 27 (and also exclusive-OR circuit 28) is equal to twice the frequency of the Schmitt trigger outputs. Since the pulses produced by the exclusive-OR circuits are combined by OR circuit 33, the frequency of the pulses produced by this OR circuit is equal to four times the frequency of the Schmitt trigger outputs. Nevertheless, this frequency of the pulses produced by OR circuit 33 is directly proportional to the transport speed of tape 1. The reason for increasing the effective frequency of the signal which represents the tape speed is to minimize an error signal which may be present while the tape speed is determined dynamically. That is, since frequency discriminator 34 is provided, the speed-proportional frequency is converted to, for example, a DC level. As the frequency applied to frequency discriminator 34 is reduced, an error signal in the output of the frequency discriminator may be present. For example, if frequency discriminator 34 includes a pulse generator coupled to an integrating capacitor, the capacitor may significantly discharge between successive lower frequency pulses. Hence, the output of the frequency discriminator would be less than the actual frequency of the pulse signals applied thereto. As the frequency of these pulse signals is reduced still further, this error signal represents yet a greater portion of the frequency discriminator output. Therefore, in order to avoid this problem, and especially to minimize the error signal which may be caused by capacitor discharge, the frequency of the pulses applied to frequency discriminator 34 is increased. In this example, the pulse frequency is increased by a factor of four, but other multiples may be used, if desired.

The output of frequency discriminator 34 is coupled to torque voltage generator 35. As shown, the torque voltage generator comprises an amplifier, such as a differential amplifier, for amplifying the frequency discriminator output level to produce torque voltage $V_s$. This torque voltage, referred to hereinafter as the supply torque voltage, is applied to change-over switches 19A and 19B and is used to determine the gate pulse which is applied to thyristor device 12A and, therefore, to determine the drive voltage which is applied to supply reel drive motor 5A.

The output of amplifier 35 is coupled to torque voltage generator 36 which, as shown, is a differential amplifier. More particularly, a preset DC level is supplied to the non-inverting input of differential amplifier 36, and supply torque voltage $V_s$ is supplied to the inverting input of this differential amplifier. Torque voltage $V_t$, hereinafter the take-up torque voltage, is proportional to the difference between the preset DC level and the supply torque voltage $V_s$. This take-up torque voltage $V_t$ is applied to change-over switches 19A and 19B and is used to determine the gate pulses applied to thyristor device 12B and, hence, to determine the drive voltage which is applied to take-up reel drive motor 5B.

Figures 4A, 4B:
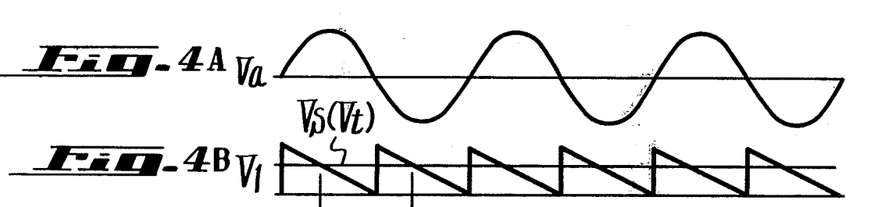
FIGS. 4A–4E are waveform diagrams which are useful in explaining the operation of a portion of the apparatus shown in FIG. 1.
Figure 4C:
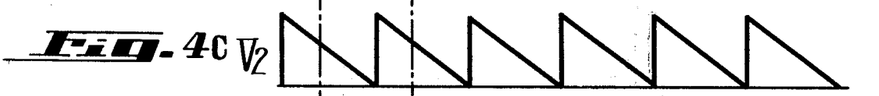
Figure 4D:
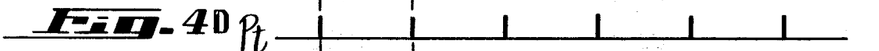

The operation of the apparatus thus far described now will be explained in conjunction with the waveform diagrams shown in FIGS. 4A–4E and 5A–5D. The AC voltage supplied to input 11 has the sinusoidal waveform $V_a$ shown in FIG. 4A. This voltage is coupled to sawtooth generator 14 which produces sawtooth signals $V_1$ and $V_2$, as shown in FIGS. 4B and 4C, respectively. Let it be assumed that change-over switches 15A and 15B assume their respective conditions as shown in FIG. 1. Hence, sawtooth signal $V_1$ is applied to comparator 16A and sawtooth signal $V_2$ is applied to comparator 16B. Take-up torque voltage $V_t$ is supplied to change-over switch 19B to comparator 16B and supply torque voltage $V_s$ is supplied through change-over switch 19A to comparator 16A. Let it be assumed that take-up torque voltage $V_t$ is much greater than supply torque voltage $V_s$. Accordingly, sawtooth signal $V_2$ is compared to take-up torque voltage $V_t$ such that when these signals exhibit equal amplitudes, comparator 16B triggers pulse generator 17B to produce pulses $P_t$, such as shown in FIG. 4D. Pulses $P_t$ are coupled to the gate electrode of thyristor device 12B so as to trigger this thyristor device to turn on for the remainder of each half-cycle, as shown by the solid curves in FIG. 4E. Therefore, the conduction angle of thyristor device 12B determines the energizing voltage which is applied to motor 5B. The conduction angle is, in turn, determined by the location in each cycle of sawtooth signal $V_2$ whereat take-up torque voltage $V_t$ is equal to the amplitude of the sawtooth signal. Hence, the relative location of gate pulses $P_t$ during each half-cycle of AC supply voltage $V_a$ is a function of the take-up torque voltage $V_t$, and establishes the conduction angle, or magnitude of the energizing voltage, which drives motor 5B.

Similarly, sawtooth signal $V_1$ is compared to supply torque voltage $V_s$ in comparator 16A. When the amplitude of sawtooth signal $V_1$ becomes equal to the supply torque voltage level, comparator 16A triggers pulse generator 17A to produce gate pulses $P_t$ which are applied to thyristor device 12A. Hence, the supply torque voltage level is determinative of the location of gate pulses $P_t$ during each half-cycle of AC voltage $V_a$ and, therefore, establishes the conduction angle, or energizing voltage magnitude, for driving motor 5A. The conduction of thyristor device 12A is depicted in FIG. 4E.

Figure 4E:
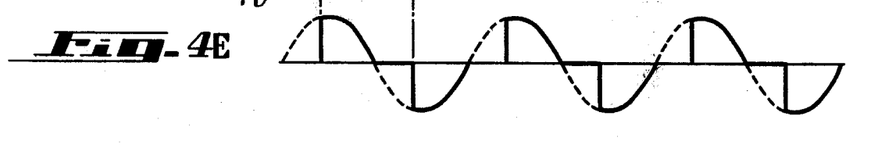

It should be appreciated that FIGS. 4D and 4E are representative of the operation of pulse generators 17A, 17B and thyristor devices 12A, 12B, respectively. However, these waveforms are not drawn to scale, nor do thyristor devices 12A and 12B exhibit equal conduction angles in practice. Rather, if tape 1 is transported in the forward direction from supply reel 2A to take-up reel 2B, thyristor device 12B exhibits a greater conduction angle than does thyristor device 12A. This means that gate pulses $P_t$ applied to thyristor device 12B occur earlier in the half-cycle of AC voltage $V_a$ than do the gate pulses which are applied to thyristor device 12A. This obtains since, as assumed, the take-up torque voltage level $V_t$ is greater than the supply torque voltage level $V_s$.

By using thyristor devices 12A and 12B, constant voltage levels are not applied to drive motors 5A and 5B. Rather, the drive voltages which are applied to these motors are represented as particular conduction angles, such as shown in FIG. 4E. The relationship between the torque developed by, for example, motor 5A and the conduction angle of the voltage applied thereto is represented as a third power relation or as a square root relation. A similar characteristic obtains for the relation between the conduction angle of the drive voltage applied to motor 5B and the torque developed by that motor. Nevertheless, these torque/voltage characteristics can be made to conform to the solid curves shown in FIG. 3 by suitably selecting the waveform and DC level of sawtooth signals $V_1$ and $V_2$. Hence, even if motors 5A and 5B are energized by voltages having conduction angles such as represented by FIG. 4E, the torque/voltage characteristics of these motors will be as shown in FIG. 3.

Figure 5A:
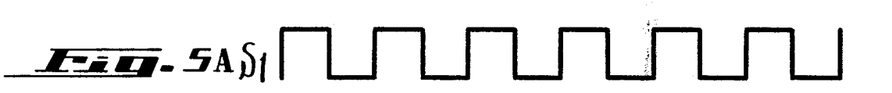
FIGS. 5A–5D are waveform diagrams which are useful in explaining the operation of another portion of the apparatus shown in FIG. 1.
Figures 5B, 5C:
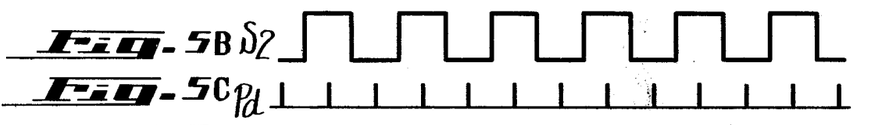
Figure 5D:
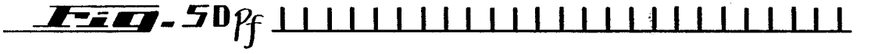

Tape 1 is transported from reel 2A to reel 2B at a speed determined by the difference between the torques developed by motors 5B and 5A, and having a back-tension which also is determined by these motor torques. This tape speed is represented by the outputs from detectors 23 and 24, which outputs are 90° out of phase with each other. These outputs, in turn, trigger Schmitt triggers 25 and 26 to produce pulse signals $S_1$ and $S_2$, as shown in FIGS. 5A and 5B. These pulse signals also are 90° out of phase with each other. Exclusive-OR circuits 27 and 28 each produces pulses $P_d$, shown in FIG. 5C, coinciding with the positive and negative transitions in signals $S_1$ and $S_2$, respectively. When pulses $P_d$ produced by exclusive-OR circuits 27 and 28 are combined in OR circuit 33, the resultant output pulses $P_f$ are as shown in FIG. 5D. The frequency of pulses $P_f$ is equal to four times the frequency of pulse signals $S_1$ or $S_2$. The frequency of pulses $P_f$ is determined by frequency discriminator 34 which produces an output level $V_h$ proportional thereto. Hence, level $V_h$ is a speed control signal proportional to the speed at which tape 1 is transported.

Level $V_h$ is amplified to produce supply torque voltage $V_s$. This supply torque voltage is subtracted from the predetermined DC bias in differential amplifier 36 to produce take-up torque voltage $V_t$.

If the speed of tape 1 increases, speed control signal $V_h$ likewise increases. This, in turn, increases the supply torque voltage level $V_s$ and decreases the take-up torque voltage level $V_t$. Thus, as is apparent, the supply and take-up torque voltage levels change differentially with respect to each other as speed control signal $V_h$ changes. An increase in the supply torque voltage level $V_s$ causes trigger pulses $P_t$ which are applied to the gate electrode of thyristor device 12A to occur earlier during each half-cycle of AC voltage $V_a$. Hence, the conduction angle of the energizing voltage applied to motor 5A increases. At the same time, by reducing the take-up torque voltage level $V_t$, pulses $P_t$ which are applied to the gate electrode of thyristor device 12B are retarded to occur at a later time during each half-cycle of AC voltage $V_a$. Hence, the conduction angle of the energizing voltage applied to motor 5B is reduced. Accordingly, the torque developed by motors 5A and 5B differentially changes, whereby torque $T_a$ imparted to supply reel 2A increases while torque $T_b$ imparted to take-up reel 2B decreases. This, in turn, reduces the speed of tape 1, thereby restoring the tape speed to its constant level.

If the speed of tape 1 decreases, the speed control signal level $V_h$ likewise decreases so as to decrease the supply torque voltage level $V_s$ and increase the take-up torque voltage level $V_t$. This retards the occurrence of the gate pulses applied to thristor device 12A while advancing the occurrence of the gate pulses applied to thyristor device 12B. Hence, the conduction angle of the energizing voltage supplied to motor 5B increases while the conduction angle of the energizing voltage supplied to motor 5A decreases. This differential change in the energizing voltages applied to the reel drive motors tends to increase the speed of tape 1 so as to restore this speed to its desired, constant value.

The illustrated apparatus also includes a command signaling circuit comprised of a manually operable selector 41 and a detector circuit 42. This command signaling circuit generates a speed command signal $S_h$ and a direction command signal $S_d$ to select the desired speed and direction, respectively, at which tape 1 is to be transported. As an example, selector 41 may comprise a rotatable knob, and detector 42 may comprise an adjustable potentiometer whose output tap is movable and is mechanically coupled to knob 41. Detector 42 also may include a bifurcated contact having a wiper ganged with the movable tap of the potentiometer so as to engage one or the other portion of the bifurcated contact. Different voltages, corresponding to a binary "1" and a "0" may be applied to the portions of the bifurcated contact such that when knob 41 is rotated in, for example, the clockwise direction, direction command signal $S_d$ produced by the wiper is equal to a binary "1", and when knob 41 is rotated in the opposite, counterclockwise direction, direction command signal $S_d$ is equal to a binary "0". If the potentiometer included in detector 42 is supplied with a positive voltage at, for example, its midpoint, and a reference voltage, such as ground, at its opposite ends, then the clockwise rotation of knob 41 will correspondingly move the tap of the potentiometer in a first direction to provide a decreasing voltage; and the counterclockwise rotation of knob 41 will move the tap of the potentiometer in the opposite direction, also to produce a decreasing voltage. Hence, speed command signal $S_h$ decreases from a maximum when knob 41 is rotated in either direction from its neutral position. Thus, when this knob assumes its neutral position, speed command signal $S_h$ exhibits a maximum value. Other constructions of detector 42 are contemplated.

As shown, speed command signal $S_h$ is applied to frequency discriminator 34 to correspondingly adjust the level of speed control signal $V_h$. Hence, frequency discriminator 34 may include a DC level changing circuit whereby speed control $V_h$ is reduced as the level of the speed command signal $S_h$ is reduced. One example of a level adjusting circuit is a gain-controlled amplifier wherein the gain of the amplifier is determined by the speed command signal $S_h$.

Direction command signal $S_d$, which may be either a binary "1" or a binary "0", is applied as a control signal to change-over switches 19A and 19B. The direction command signal $S_d$ will be equal to a binary "1" when knob 41 is rotated in a direction to select the transport direction of tape 1 from reel 2A to reel 2B. If the opposite direction of tape transport is selected, direction command signal $S_d$ is a binary "0". When a binary "1" is supplied as the control signal to change-over switches 19A and 19B, these switches exhibit the state illustrated in FIG. 1. Conversely, if a binary "0" is applied as the control signal, change-over switches 19A and 19B are changed over such that switch 19A supplies take-up torque voltage $V_t$ to comparator 16A and switch 19B supplies supply torque voltage $V_s$ to comparator 16B.

In operation, if the transport speed of tape 1 is to be increased, knob 41 is rotated to reduce the speed command signal $S_h$. This, in turn, reduces the speed control signal level $V_h$ to reduce the supply torque voltage $V_s$ while increasing the take-up torque voltage $V_t$. An increase in the take-up torque voltage advances the occurrence of the gate pulses applied to thyristor device 12B; while a reduction in the supply torque voltage retards the occurrence of the gate pulses applied to thyristor device 12A. Hence, the conduction angle of the energizing voltage applied to motor 5B increases while the conduction angle of the energizing voltage applied to motor 5A decreases. This differential change in the torque supplied to the reel drive motors results in an increase in the tape transport speed. Conversely, if knob 41 is rotated in a direction to reduce the tape transport speed, speed command signal $S_h$ increases to increase speed control signal level $V_h$, thereby increasing the supply torque voltage level $V_s$ and decreasing the take-up torque voltage level $V_t$. This adjustment in the torque voltages differentially changes the energizing voltages applied to the supply and take-up reel drive motors, respectively, in a direction to reduce the speed of tape 1.

The foregoing operation has assumed that knob 41 is angularly rotated in a clockwise direction relative to its neutral position such that direction command signal $S_d$ is a binary "1". However, if knob 41 is rotated in the opposite direction so as to change the direction command signal $S_d$ to a binary "0", change-over switches 19A and 19B are operated. That is, the supply torque voltage level $V_s$, as adjusted by the operation of knob 41, is applied through switch 19B to comparator 16B, thereby establishing the supply torque voltage level for controlling motor 5B to operate as the supply reel drive motor. Also, take-up torque voltage level $V_t$, adjusted in accordance with the operation of knob 41, is applied through switch 19A to comparator 16A, thereby providing the take-up torque voltage for motor 5A which is operated as the take-up reel drive motor. Thus, the torque developed by motor 5A exceeds the torque developed by motor 5B so as to reverse the direction in which tape 1 is transported. Thus, it is seen that knob 41 is selectively operated to determine the speed and direction at which tape 1 is transported.

In accordance with a desirable feature of the apparatus illustrated in FIG. 1, the energizing voltages which are applied to motors 5A and 5B are adjusted, or compensated, as a function of the effective diameters of the tape wound upon the supply and take-up reels. This feature is carried out by shutter discs 51A and 51B, coupled to and rotatable with reels 2A and 2B, respectively, Schmitt triggers 53A and 53B, frequency discriminators 54A and 54B, and comparators 55A and 55B. As is known, as the amount of tape wound upon a reel increases, the rotation of that reel must decrease in order to maintain a constant linear tape speed. Similarly, as the amount of tape wound upon a reel decreases the rotation of that reel increases. Thus, as tape is payed out from reel 2A and wound upon reel 2B, the angular velocity of reel 2A, and thus of shutter disc 51A, increases while the angular velocity of reel 2B, and thus shutter disc 51B, decreases. Shutter discs 51A and 51B are provided with periodic serrations 51a and 51b, similar to shutter disc 22. Also, shutters 51A and 51B are provided with photodetectors 52A and 52B, respectively, these photodetectors being similar to aforedescribed photodetectors 23 and 24. The output of photodetector 52A is coupled to Schmitt trigger 53A, and the output of photodetector 52B is coupled to Schmitt trigger 53B. Schmitt triggers 53A and 53B are responsive to the respective photodetector outputs to produce pulse signals, the frequency of these pulse signals varying in accordance with the angular velocity of the respective shutter discs. The outputs of Schmitt triggers 53A and 53B are coupled to frequency discriminators 54A and 54B, respectively, each frequency discriminator preferably including an integrating capacitor so as to produce an output DC voltage level proportional to the frequency of the pulses applied thereto by the Schmitt trigger, this DC voltage level thus being proportional to the angular velocity of the associated shutter disc.

Comparators 55A and 55B are coupled to frequency discriminators 54A and 54B, respectively, and also are adapted to receive the speed control signal level $V_h$. Each comparator is adapted to compare the output of its associated frequency discriminator, that is, the signal proportional to the angular velocity of the associated shutter disc, to the speed control signal level $V_h$. That is, each comparator compares the angular velocity of either the supply or take-up reel to the linear velocity of the tape. Comparators 55A and 55B are adapted to produce switching signals in accordance with these comparisons, the switching signals being applied as a binary "1" or a binary "0" to change-over switches 15A and 15B, respectively.

In operation, let it be assumed that tape 1 is transported from supply reel 2A to take-up reel 2B. Initially, reel 2A and shutter disc 51A will rotate at a slower speed than reel 2B and shutter disc 21B. The level produced by frequency discriminator 54A, which is proportional to the angular speed of reel 2A, is less than speed control signal level $V_h$. Hence, a binary "0" is applied by comparator 55A to change-over switch 15A, thereby operating switch 15A such that sawtooth signal $V_1$ is supplied to comparator 16A. At the same time, the level produced by frequency discriminator 54B, which is proportional to the angular speed of reel 2B, is greater than the speed control signal level $V_h$. Hence, comparator 55B applies a binary "1" to change-over switch 15B, thereby operating this switch so that sawtooth signal $V_2$ is supplied thereby to comparator 19B.

Now, as the effective diameter of supply reel 2A decreases, its angular velocity increases. A diameter will be reached wherein the level produced by frequency discriminator 54A is equal to and then greater than the speed control signal level $V_h$. At that time, comparator 55A applies a binary "1" to change-over switch 15A, thereby operating the change-over switch to supply sawtooth signal $V_2$ to comparator 16A. Since sawtooth signal $V_2$ is greater than sawtooth signal $V_1$, which had been applied previously to comparator 16A, the amplitude of sawtooth signal $V_2$ will be equal to the supply torque voltage level $V_s$ at a time that is further into the cycle of sinusoidal AC voltage $V_a$. Thus, by applying sawtooth signal $V_2$ to comparator 16A, the conduction angle of the energizing voltage applied to motor 5A by thyristor device 12A is reduced. That is, when the effective reel diameter of supply reel 2A is reduced below a threshold level, the energizing voltage applied to reel drive motor 5A is reduced so as to correspondingly reduce the torque imparted to reel 2A.

As the effective diameter of take-up reel 2B increases, its angular velocity decreases. Hence, the level produced by frequency discriminator 54B is reduced until it becomes equal to and then less than the speed control signal level $V_h$. At that time, the binary "1" produced by comparator 55B is changed to a binary "0", so as to operate change-over switch 15B whereby this switch now couples sawtooth signal $V_1$ to comparator 16B. Since the level of sawtooth signal $V_1$ is less than that of sawtooth signal $V_2$, take-up torque voltage level $V_t$ will be equal to the amplitude of sawtooth signal $V_1$ at a time that is earlier into the cycle of AC voltage $V_a$. Hence, the conduction angle of the energizing voltage applied to motor 5B by thyristor device 12B is increased. Therefore, as the effective diameter of reel 2B increases beyond a threshold, the torque imparted to this reel by reel drive motor 5B is increased.

Thus, when the effective diameter of the supply reel is reduced below a predetermined amount, the energizing voltage applied to its associated reel drive motor is reduced so as to correspondingly reduce the supply reel torque. Conversely, when the effective diameter of the take-up reel exceeds that predetermined amount, the energizing voltage applied to the take-up reel drive motor is increased to correspondingly increase the torque imparted to the take-up reel.

In accordance with another feature of the apparatus illustrated in FIG. 1, a protective circuit is provided to prevent sudden, undesired reversal in tape 1 in the event that command knob 41 suddenly is adjusted, such as returned to its neutral position. The advantages obtained from this feature are explained as follows:

Let it be assumed that tape 1 is transported from reel 2A to reel 2B at a relatively high speed. Hence, supply torque voltage level $V_s$ is much less than take-up torque voltage level $V_t$. Let it also be assumed that sawtooth signal $V_1$ is applied to comparator 16A while sawtooth signal $V_2$ is applied to comparator 16B. Now, if knob 41 suddenly is returned to its neutral position, speed command signal $S_h$ is sharply increased. This, in turn, increases the speed control signal level $V_h$ so as to increase the supply torque voltage level $V_s$ while decreasing the take-up torque voltage level $V_t$. It is possible that comparator 16A determines that sawtooth signal $V_1$ reaches an amplitude equal to supply torque voltage level $V_s$ before comparator 16B determines that sawtooth signal $V_2$ reaches a level equal to the take-up torque voltage level $V_t$. Thus, the gate pulses applied to thyristor device 12A may occur earlier in the cycle of AC voltage $V_a$ than do the gate pulses applied to thyristor device 12B. Consequently, the conduction angle of the energizing voltage applied to supply reel drive motor 5A may exceed the conduction angle of the energizing voltage supplied to take-up reel drive motor 5B.

This means that the sudden return of knob 41 to its neutral position may command a reverse movement in the tape transport direction.

To avoid this possibility, a preventive circuit is provided to detect whether the actual tape transport direction is equal to the commanded tape transport direction. If these directions differ, the supply and take-up voltage levels no longer are determined by the speed control signal $V_h$. Rather, predetermined supply and take-up torque voltage levels are produced.

This preventive circuit is comprised of a D-type flip-flop circuit 61 having its D input coupled to Schmitt trigger 25 so as to receive pulse signal $S_1$ (FIG. 5A), and its timing input coupled to Schmitt trigger 26 so as to receive pulse signal $S_2$ (FIG. 5B). The output of flip-flop 61 is coupled to one input of an exclusive-OR circuit 62, the other input of which being coupled to detector 42 so as to receive the direction command signal $S_d$. The output of exclusive-OR circuit 62 is coupled to the base electrode of a transistor 63 whose emitter electrode is coupled to a predetermined voltage, which may be ground, and whose collector electrode is coupled through a reversely poled diode to the output of amplifier 35.

The D-type flip-flop 61 is adapted to detect the direction in which tape 1 actually is transported and to produce a binary signal corresponding to the detected tape direction. As shown in FIGS. 5A and 5B, pulse signal $S_1$ leads pulse signal $S_2$ by 90°. Hence, if tape 1 is transported from reel 2A to reel 2B, pulse signal $S_1$ is applied to the D input before pulse signal $S_2$ is applied to the timing input. Therefore, when tape 1 is transported in the forward direction, flip-flop 61 produces a binary "1". However, if tape 1 is transported in the reverse direction, it is seen that the relatively lower, or negative portion of pulse signal $S_1$ is applied to the D input at the time that a positive transition in pulse signal $S_2$ is applied to the timing input of flip-flop 61. Thus, when tape 1 is transported in the reverse direction, flip-flop 61 produces a binary "0".

It is recalled that direction command signal $S_d$ is a binary "1" when forward tape movement is commanded, and is a binary "0" when reverse tape movement is commanded. Thus, if tape 1 actually is moving in the forward direction and forward tape movement is commanded, a binary "1" is appied to each input of exclusive-OR circuit 62. Also, if tape 1 actually is moving in the reverse direction and a reverse tape movement is commanded, a binary "0" is applied to both inputs of exclusive-OR circuit 62. Thus, when tape 1 is moving in the commanded direction, exclusive-OR circuit 62 applies a binary "0" to transistor 63, thereby maintaining that transistor in its de-energized, or non-conductive condition. However, if tape 1 actually is moving in the forward direction but knob 41 is operated to command a reverse direction, different binary signals are applied to exclusive-OR circuit 62. Thus, the exclusive-OR circuit applies a binary "1" to transistor 63, thereby rendering this transistor conductive. Likewise, transistor 63 will be rendered conductive if tape 1 actually is moving in the reverse direction and knob 41 is operated to command a forward tape movement. When the transistor conducts, a relatively low voltage is applied to the output of amplifer 35. Hence, supply torque voltage level $V_s$ is changed to a predetermined level. Also, this relatively low level is substrated from the DC bias level applied to differential amplifier 36, thereby resulting in a predetermined take-up torque voltage level $V_t$. Hence, if the actual tape transport direction differs from the commanded direction, such as when an improper command inadvertently is produced, the take-up torque increases so as to avoid any abnormality in the tape movement.

To summarize, the apparatus illustrated in FIG. 1 operates to generate differential torques which are imparted to reels 2A and 2B so as to selectively control the speed and direction of tape 1, and to provide a substantially constant back-tension to this tape. The torques are developed as represented by the solid curves in FIG. 3, thereby avoiding damage to the tape in the event of variation in tape friction as the tape is transported about various members. Furthermore, if a speed reduction is commanded, the differential torques may be correspondingly changed, and even reversed, without the danger of tape rapidly unwinding from the supply reel.

While the present invention has been particularly shown and described with reference to a preferred embodiment thereof, it will be readily apparent to one of ordinary skill in the art that various changes and modifications in form and details can be made without departing from the spirit and scope of the invention. For example, exclusive-OR circuits 27 and 28, together with delay circuits 31 and 32 can be replaced by, for example, differentiating circuits for the purpose of generating pulses $P_d$ at the positive and negative transitions in pulse signals $S_1$ and $S_2$. In another alternative, induction motors 5A and 5B are replaced by DC motors. Also, change-over switches 15A, 15B and 19A, 19B preferably are solid-state switching devices. As yet another alternative, shutter disc 22 and photodetectors 23 and 24 can be replaced by other speed-detecting devices. For example, if tape 1 is video tape having the usual periodic control pulses recorded along an edge thereof, these pulses can be sensed and the frequency thereof (or multiple of that frequency) can be utilized as an indication of the speed of the tape. Therefore, it is intended that the appended claims be interpreted as including the foregoing as well as various other such changes and modifications.

What is claimed is:
1. Tape control apparatus comprising:
first and second reel members for supplying and taking up tape;
first and second drive motors coupled to said first and second reel members, respectively, for applying oppositely directed torques to said first and second reel members, thereby bi-directionally driving tape between said reel members and applying tension to the driven tape;
speed detecting means for detecting the transport speed of said tape and for generating a speed control signal proportional to said detected tape speed;
torque voltage generating means responsive to said speed control signal for generating first and second torque voltages determinative of said torques respectively applied to said first and second reel members by said first and second drive motors, said first and second torque voltages changing differentially with respect to each other as said speed control signal changes;
first and second motor drive means responsive to said first and second torque voltages, respectively, for applying first and second drive signals to said first and second drive motors to control the torques applied by said drive motors to said reel members, whereby said tape is transported at a substantially constant speed;

means for applying said first and second torque voltages to said first and second motor drive means;

command signaling means for generating command signals to establish the speed and direction at which said tape is transported; and means responsive to said command signals for adjusting said first and second torque voltages applied to said first and second motor drive means to differentially change the torques applied by said first and second drive motors to said first and second reel members;

said first and second motor drive means comprising means for generating alternating reference signals, comparator means for comparing said first and second torque voltages applied thereto to said alternating reference signals to determine the respective locations in the cycles of said reference signals whereat said first and second torque voltages are equal to said reference signals, and first and second means for applying first and second alternating drive signals to said first and second motors, said first and second alternating drive signals having conduction angles established by said comparator means.

2. The apparatus of claim 1 wherein said alternating reference signals comprise first and second sawtooth signals; said comparator means comprises first and second comparators each for comparing one of said torque voltages to a respective sawtooth signal, and first and second pulse generating means coupled to said first and second comparators, respectively, each generating a pulse signal when a torque voltage is equal to a sawtooth signal amplitude; and wherein said first and second means each comprises thyristor means for receiving one of said pulse signals as a gating signal and for receiving an alternating drive signal synchronized with said sawtooth signals.

3. The apparatus of claim 1 wherein said command signals comprise a speed command signal and a direction command signal; and wherein said means responsive to said command signals for adjusting said first and second torque voltages comprises level adjust means responsive to said speed command signal for differentially adjusting the torque voltage levels such that the torque voltage level applied to the one motor drive means which applies drive signals to the take-up reel drive motor increases and the torque voltage level applied to the other motor drive means decreases in response to an increasing speed command signal, and said torque voltage level applied to said one motor drive means decreases and said torque voltage level applied to said other motor drive increases in response to a decreasing speed command signal.

4. The apparatus of claim 3 wherein said speed detecting means comprises variable frequency generating means for generating a signal whose frequency varies as a function of the speed of said tape, and frequency discriminating means for producing a voltage level proportional to the frequency of said generated signal; and wherein said level adjust means comprises means for adjusting the level of said produced voltage in accordance with said speed command signal.

5. The apparatus of claim 4 wherein said torque voltage generating means comprises an amplifier for amplifying said adjusted voltage level to produce the torque voltage applied to said other motor drive means; and a difference amplifier for subtracting said amplified adjusted voltage level from a bias level to produce the torque voltage applied to said one motor drive means.

6. The apparatus of claim 5 wherein said means for applying said first and second torque voltages to said first and second motor drive means comprises first and second change-over switch means selectively responsive to said direction command signal for changing over the torque voltages applied to said first and second motor drive means in accordance with a change in said direction command signal.

7. The apparatus of claim 3 further comprising tape direction sensing means for sensing the actual direction in which said tape is transported; compare means for comparing the actual tape transport direction to said direction command signal; and means for producing predetermined torque voltages to be applied to said first and second motor drive means if the actual tape transport direction differs from said direction command signal.

8. Tape control apparatus comprising:

first and second reel members for supplying and taking up tape;

first and second drive motors coupled to said first and second reel members, respectively, for applying oppositely directed torques to said first and second reel members, thereby bi-directionally driving tape between said reel members and applying tension to the driven tape;

speed detecting means for detecting the transport speed of said tape and for generating a speed control signal proportional to said detected tape speed;

torque voltage generating means responsive to said speed control signal for generating first and second torque voltages determinative of said torques respectively applied to said first and second reel members by said first and second drive motors, said first and second torque voltages changing differentially with respect to each other as said speed control signal changes;

first and second motor drive means responsive to said first and second torque voltages, respectively, for applying first and second drive signals to said first and second drive motors to control the torques applied to said drive motors to said reel members, whereby said tape is transported at a substantially constant speed;

means for applying said first and second torque voltages to said first and second motor drive means;

command signaling means for generating command signals to establish the speed and direction at which said tape is transported;

means responsive to said command signals for adjusting said first and second torque voltages applied to said first and second motor drive means to differentially change the torques applied by said first and second drive motors to said first and second reel members;

said first and second motor drive means comprising sawtooth signal generating means for generating first and second sawtooth signals, first and second comparators for comparing said first and second torque voltages to said first and second sawtooth signals, first and second change-over switches for applying said first and second sawtooth signals to said first and second comparators, first and second pulse generators for generating first and second pulse signals when said first torque voltage compares to said first sawtooth signal and said second torque voltage compares to said second sawtooth signal, respectively, and first and second thyristor means both supplied with a reference signal and triggered by said first and second pulse signals, respectively, to supply respective conduction angles to said first and second drive motors;

reel diameter sensing means for sensing the reel diameters of the tape wound about said first and second reel members; and means for selectively changing over said first and second change-over switches to change the sawtooth signals applied to said first and second comparators when the associated reel diameter changes beyond a predetermined threshold.

9. The apparatus of claim 8 wherein said reel diameter sensing means comprises first and second frequency generators coupled to said first and second reel members, respectively, for generating first and second signals having frequencies proportional to the rotary speeds of said respective reel members; first and second frequency discriminators for producing first and second signal levels proportional to said first and second frequencies, respectively; and first and second comparators for comparing said first and second signal levels to said speed control signal, such that each comparator produces a first output if said respective signal level exceeds said speed control signal, indicative of a reel diameter less than said threshold, and a second output if said respective signal level is less than said speed control signal, indicative of a reel diameter greater than said threshold.

10. Apparatus for controlling the speed, direction and tension of tape transported between a supply reel and a take-up reel, comprising:

supply and take-up reel drive motors coupled to said supply and take-up reels, respectively, for applying oppositely directed torques thereto to bi-directionally drive said tape between said supply and take-up reels and to apply tension to the driven tape;

speed detecting means for detecting the transport speed of said tape and for generating a speed control signal proportional thereto;

torque voltage generating means responsive to said speed control signal for generating a supply torque voltage determinative of the torque to be supplied to said supply reel and a take-up torque voltage determinative of the torque to be supplied to said take-up reel, said supply and take-up torque voltages changing differentially with respect to each other as said speed control signal changes;

supply drive signal generating means for generating a supply drive signal as a function of said supply torque voltage and for supplying said supply drive signal to said supply reel drive motor to exert a back tension of said tape;

take-up drive signal generating means for generating a take-up drive signal as a function of said take-up torque voltage and for supplying said take-up drive signal to said take-up reel drive motor to cause said tape to be transported to said take-up reel;

means for applying said supply and take-up torque voltages to said supply and take-up drive signal generating means, respectively;

command signaling means for generating a speed command signal to establish the tape transport speed and for generating a direction command signal to establish the tape transport direction;

means for differentially modifying said supply and take-up torque voltages in accordance with said speed command signal;

means for selectively controlling to which of said drive signal generating means said supply and take-up torque voltages are applied in accordance with said direction command signal;

means for detecting the effective diameters of the tape wound upon said supply and take-up reels; and means for modifying said supply and said take-up drive signals in accordance with the detected effective reel diameters.

11. The apparatus of claim 10 wherein said means for modifying said supply and said take-up drive signals comprises first means for reducing said supply drive signal when the effective diameter of said supply reel is reduced below a predetermined amount, and second means for increasing said take-up drive signal when the effective diameter of said take-up reel exceeds said predetermined amount.

12. The apparatus of claim 10 wherein said means for detecting the effective diameters of the tape wound upon said supply and take-up reels comprises supply reel speed detecting means for detecting the rotary speed of said supply reel and for generating a supply reel speed signal proportional thereto; take-up reel speed detecting means for detecting the rotary speed of said take-up reel and for generating a take-up reel speed signal proportional thereto; first means for determining whether said supply reel speed signal is less than said speed control signal, representing that said effective supply reel diameter is greater than a predetermined amount; and second means for determining whether said take-up reel speed signal is greater than said speed control signal, representing that said effective take-up reel diameter is less than said predetermined amount.

13. Apparatus for controlling the speed, direction and tension of tape transported between a supply reel and a take-up reel, comprising:

supply and take-up reel drive motors coupled to said supply and take-up reels, respectively, for imparting oppositely directed torques thereto to bi-directionally drive said tape between said supply and take-up reels and to apply tension to the driven tape;

speed detecting means for detecting the transport speed of said tape and for generating a speed control signal proportional thereto;

torque voltage generating means responsive to said speed control signal for generating a supply torque voltage determinative of the torque to be imparted to said supply reel and a take-up torque voltage determinative of the torque to be imparted to said take-up reel, said supply and take-up torque voltages changing differentially with respect to each other as said speed control signal changes;

supply drive signal generating means for generating a supply drive signal as a function of said supply torque voltage and for supplying said supply drive signal to said supply reel drive motor to exert a back tension on said tape;

take-up drive signal generating means for generating a take-up drive signal as a function of said take-up torque voltage and for supplying said take-up drive signal to said take-up reel drive motor to cause said tape to be transported to said take-up reel;

means for applying said supply and take-up torque voltages to said supply and take-up signal generating means, respectively;

command signaling means for generating a speed command signal to command the tape transport speed and for generating a direction command signal to command the tape transport direction;

means for differentially modifying said supply and take-up torque voltages in accordance with said speed command signal;

means for selectively controlling which of said drive signal generating means said supply and take-up torque voltages are applied in accordance with said direction command signal;

means for determining whether the direction in which said tape actually is transported corresponds to the direction commanded by said direction command signal; and means for controlling said torque voltage generating means in accordance with said last-mentioned means to generate predetermined supply and take-up torque voltages in the event that said actual tape transport direction differs from said commanded direction.

14. The apparatus of claim 13 wherein said means for controlling said torque voltage generating means comprises switch means energized if said actual tape transport direction differs from said commanded direction to apply a predetermined voltage to said torque voltage generating means.

15. Apparatus for controlling the speed, direction and tension of tape transported between a supply reel and a take-up reel, comprising:

supply and take-up reel drive motors coupled to said supply and take-up reels, respectively, for imparting oppositely directed torques thereto to bi-directionally drive said tape between said supply and take-up reels and to apply tension to the driven tape;

speed detecting means for detecting the transport speed of said tape and for generating a speed control signal proportional thereto;

torque voltage generating means responsive to said speed control signal for generating a supply torque voltage determinative of the torque to be imparted to said supply reel and a take-up torque voltage determinative of the torque to be imparted to said take-up reel, said supply and take-up torque voltages changing differentially with respect to each other as said speed control signal changes so as to stabilize said tape transport speed;

supply drive signal generating means for generating a supply drive signal as a function of a torque voltage applied thereto and for supplying said supply drive signal to said supply reel drive motor to exert a back tension on said tape;

take-up drive signal generating means for generating a take-up drive signal as a function of a torque voltage applied thereto and for supplying said take-up drive signal to said take-up reel drive motor to cause said tape to be transported to said take-up reel;

means for applying said supply and take-up torque voltages to selected ones of said supply and take-up signal generating means;

command signaling means for generating a speed command signal to command the tape transport speed and for generating a direction command signal to command the tape transport direction;

means for modifying said speed control signal in accordance with said speed command signal;

means for determining which of said supply and take-up drive signal generating means and supply and take-up torque voltages are applied in accordance with said direction command signal;

means for determining whether the direction in which said tape actually is transported corresponds to the direction commanded by said direction command signal;

means for controlling said torque voltage generating means in accordance with said direction determining means to generate predetermined supply and take-up torque voltages in the event that said actual tape transport direction differs from said commanded direction;

means for detecting the effective diameters of the tape wound upon said supply and take-up reels; and means for selectively modifying said supply and said take-up drive signals in accordance with the detected effective reel diameters.

* * * * *